(12) United States Patent  
Kurian

(10) Patent No.: US 11,144,844 B2  
(45) Date of Patent: Oct. 12, 2021

(54) REFINING CUSTOMER FINANCIAL SECURITY TRADES DATA MODEL FOR MODELING LIKELIHOOD OF SUCCESSFUL COMPLETION OF FINANCIAL SECURITY TRADES

(71) Applicant: Bank of America Corporation, Charlotte, NC (US)

(72) Inventor: Manu Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 1157 days.

(21) Appl. No.: 15/497,471

(22) Filed: Apr. 26, 2017

(65) Prior Publication Data

US 2018/0314952 A1    Nov. 1, 2018

(51) Int. Cl.
*G06N 20/00* (2019.01)
*G06Q 10/06* (2012.01)
*G06Q 10/10* (2012.01)

(52) U.S. Cl.
CPC ......... *G06N 20/00* (2019.01); *G06Q 10/0635* (2013.01); *G06Q 10/0637* (2013.01); *G06Q 10/06375* (2013.01); *G06Q 10/10* (2013.01)

(58) Field of Classification Search
CPC .. G06Q 30/02; G06Q 10/063; G06Q 10/0637; G06Q 10/06375; G06Q 10/0639
See application file for complete search history.

(56) References Cited

U.S. PATENT DOCUMENTS

| 6,317,728 | B1  |    | 11/2001 | Kane       |              |
|-----------|-----|----|---------|------------|--------------|
| 6,430,539 | B1  | *  | 8/2002  | Lazarus    | G06Q 30/02   |
|           |     |    |         |            | 705/14.1     |
| 6,430,615 | B1  | *  | 8/2002  | Hellerstein| H04L 41/0233 |
|           |     |    |         |            | 709/202      |
| 6,647,372 | B1  | *  | 11/2003 | Brady      | G06Q 20/20   |
|           |     |    |         |            | 705/14.25    |
| 7,392,157 | B1  | *  | 6/2008  | Delurgio   | G06Q 10/04   |
|           |     |    |         |            | 702/181      |
| 8,275,690 | B2  |    | 9/2012  | Wallman    |              |

(Continued)

OTHER PUBLICATIONS

Machine Learning, Wikipedia, The Free Encyclopedia, retrieved from Internet Apr. 11, 2017, https://en.wikipedia.org/wiki/Machine_learning.

(Continued)

*Primary Examiner* — Scott L Jarrett
(74) *Attorney, Agent, or Firm* — Banner & Witcott, Ltd.; Michael A. Springs

(57) ABSTRACT

Systems, methods, and apparatus for artificially intelligent historical analysis modeling and computer transaction ranking are disclosed. An example method comprises generating, by a computing device, a model based on a plurality of first computer transactions associated with one or more user profiles, determining, by the computing device, a subset of the plurality of first computer transactions associated with the one or more user profiles that correspond to successful computer transactions, refining, by the computing device, the generated model based on the subset, applying the generated model to one or more second computer transactions initiated by a user, and determining, based on an output of the generated model, a likelihood of success for the one or more second computer transactions.

15 Claims, 4 Drawing Sheets

(56) References Cited

U.S. PATENT DOCUMENTS

| | | | |
|---|---|---|---|
| 8,489,499 B2 | 7/2013 | Yan et al. | |
| 8,788,306 B2* | 7/2014 | Delurgio | G06Q 10/063 705/7.11 |
| 9,330,416 B1 | 5/2016 | Zaslavsky et al. | |
| 9,349,103 B2 | 5/2016 | Eberhardt, III et al. | |
| 9,384,493 B2 | 7/2016 | Harris et al. | |
| 10,482,490 B2* | 11/2019 | Capel | G06Q 30/0244 |
| 10,565,181 B1* | 2/2020 | Hjermstad | G06F 16/2379 |
| 10,740,404 B1* | 8/2020 | Hjermstad | G06F 16/909 |
| 2003/0233325 A1* | 12/2003 | Belyi | G06Q 40/00 705/42 |
| 2004/0064357 A1* | 4/2004 | Hunter | G06Q 30/02 705/2 |
| 2005/0015323 A1 | 1/2005 | Myr | |
| 2006/0026642 A1* | 2/2006 | Schaffer | H04N 21/482 725/46 |
| 2007/0129956 A1* | 6/2007 | Stinski | G06Q 30/02 705/1.1 |
| 2007/0299798 A1* | 12/2007 | Suyama | G06F 17/18 706/21 |
| 2008/0065464 A1* | 3/2008 | Klein | G06Q 30/02 705/7.31 |
| 2008/0071630 A1* | 3/2008 | Donahue | G06Q 30/02 705/7.11 |
| 2009/0276377 A1* | 11/2009 | Dutta | G06Q 30/02 706/12 |
| 2012/0078681 A1* | 3/2012 | Rahman | G06Q 30/0201 705/7.29 |
| 2012/0109821 A1 | 5/2012 | Barbour et al. | |
| 2012/0197758 A1* | 8/2012 | Zhong | G06Q 50/01 705/26.35 |
| 2012/0316843 A1* | 12/2012 | Beno | G06Q 10/0639 703/2 |
| 2013/0254080 A1* | 9/2013 | Shan | G06Q 30/02 705/30 |
| 2014/0081879 A1* | 3/2014 | Olson | G06Q 30/0241 705/319 |
| 2014/0279367 A1* | 9/2014 | Srivastava | G06Q 40/04 705/37 |
| 2015/0081491 A1* | 3/2015 | Brereton | G06Q 40/12 705/35 |
| 2015/0081492 A1* | 3/2015 | Brereton | G06Q 40/02 705/35 |
| 2015/0081542 A1* | 3/2015 | Brereton | G06Q 20/4016 705/44 |
| 2015/0081543 A1* | 3/2015 | Brereton | G06Q 20/4016 705/44 |
| 2016/0104163 A1 | 4/2016 | Aquino et al. | |
| 2016/0269378 A1 | 9/2016 | Ye | |
| 2016/0350505 A1* | 12/2016 | Cho | G16H 50/50 |
| 2017/0004408 A1* | 1/2017 | Edelen | G06Q 30/02 |
| 2017/0301015 A1* | 10/2017 | Tunnell | G06N 7/005 |
| 2018/0052804 A1* | 2/2018 | Mikami | G06N 7/005 |
| 2018/0089585 A1* | 3/2018 | Rickard, Jr. | G06N 20/00 |
| 2018/0174056 A1* | 6/2018 | Madison | G06Q 10/00 |

OTHER PUBLICATIONS

Stock Analysis 101, Fundamental Analysis, TheStreet, retrieved from Internet Apr. 24, 2017, https://www.thestreet.com/story/10362279/1/getting-started-fundamental-analysis.html.

* cited by examiner

REFINING CUSTOMER FINANCIAL SECURITY TRADES DATA MODEL FOR MODELING LIKELIHOOD OF SUCCESSFUL COMPLETION OF FINANCIAL SECURITY TRADES

TECHNICAL FIELD

Aspects of the present disclosure generally relate to data processing utilizing artificial intelligence to analyze historical models and rank computer transactions for statistical learning.

BACKGROUND

Commonly, when an individual is to make a decision, he or she performs research, consults with an advisor, or otherwise makes preparations for his or her selection. Of course, such preparations are often time-intensive. With the rise of the digital age, more and more decisions are becoming so streamlined that users may make decisions too quickly without adequate research. For example, selecting a college major may be as simple as selecting an option in a drop down box on a college website. Likewise, spending thousands of dollars can be as simple as clicking a button. Additionally, users may make a plurality of decisions via computer transactions within a single day.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure concern using artificial intelligence such as, for example, neural networks or other machine learning algorithms, to analyze historical models created for successful users detailing behavior of the user in computer transactions associated with numerous variables, to determine a likelihood of success based on the historical model analysis, and to rank similar future computer transactions in association with the likelihood of success. In some examples, multi-level authorization is disclosed reiterating the likelihood of success of a computer transaction prior to a user selection of the computer transaction.

An example system may comprise a data ranking engine configured to identify a user profile associated with historically successful computer transactions; a model generator configured to collect behavioral data associated with the user profile, wherein the behavioral data comprises a plurality of events corresponding to the successful computer transactions, receive auxiliary data corresponding to each event, and generate a model based on the behavioral data and auxiliary data; and a model refiner configured to, for each event determine a predicted outcome with a likelihood of success, compare the predicted outcome with an actual outcome associated with the historically successful computer transactions, and adjust, based on the comparison, the generated model.

An example apparatus comprises one or more processors, and a memory comprising instructions that, when executed by the one or more processors, cause the apparatus to at least, generate a model based on one or more first computer transactions; identify a user profile associated with historically successful computer transactions of the one or more first transactions; collect behavioral data associated with the user profile, wherein the behavioral data comprises a plurality of events corresponding to the successful computer transactions; for each event of the plurality of events determine a predicted outcome with a likelihood of success, compare the predicted outcome with an actual outcome associated with the historically successful computer transactions, and adjust, based on the comparison, the generated model; and determine, based on an output of the generated model, a likelihood of success for one or more second computer transactions initiated by a user.

An example method comprises generating, by a computing device, a model based on a plurality of first computer transactions associated with one or more user profiles, determining, by the computing device, a subset of the plurality of first computer transactions associated with the one or more user profiles that correspond to successful computer transactions, refining, by the computing device, the generated model based on the subset, applying the generated model to one or more second computer transactions initiated by a user, and determining, based on an output of the generated model, a likelihood of success for the one or more second computer transactions.

DETAILED DESCRIPTION

Figure 1:
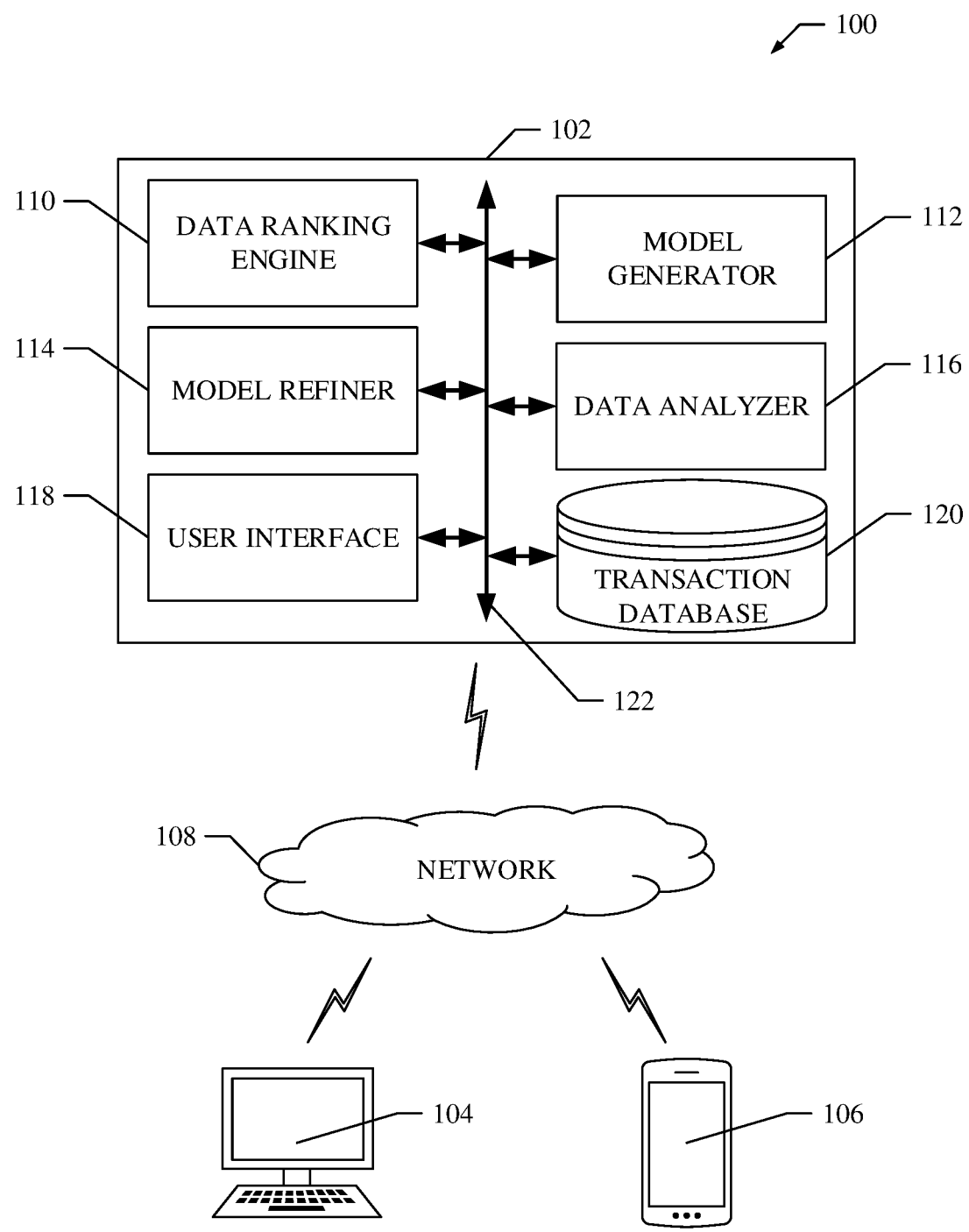
FIG. 1 illustrates an example environment comprising an example modeler in communication with an example first computing device and an example second computing device via an example network.

In the following description of the various embodiments, reference is made to the accompanying drawings, which form a part hereof, and in which is shown by way of illustration, various embodiments of the disclosure that may be practiced. It is to be understood that other embodiments may be utilized.

Aspects of the present disclosure relate to identifying users successful with computer transactions, building one or more models, and applying the one or more models to future transactions for assisting inexperienced users.

An example system to model successful computer transaction may comprise a data ranking engine configured to identify a user profile associated with historically successful computer transactions; a model generator configured to collect behavioral data associated with the user profile, wherein the behavioral data comprises a plurality of events corresponding to the successful computer transactions, receive auxiliary data corresponding to each event, and generate a model based on the behavioral data and auxiliary data; and a model refiner configured to, for each event determine a predicted outcome with a likelihood of success, compare the predicted outcome with an actual outcome associated with the historically successful computer transactions, and adjust, based on the comparison, the generated model.

In some examples, the system further comprises a data analyzer configured to generate a profile score for the user profile.

In some examples, the data ranking engine is further configured to rank, based on the profile score, the user profile among a plurality of user profiles.

In some examples, the auxiliary data comprises at least one of current events, economic conditions, market conditions, environmental conditions, fiscal disclosures of one or more companies involved with each event, investment portfolio distribution associated with the user profile, associated accidents, contractual obligations, or any combination thereof.

In some examples, the system further comprises a data analyzer configured to determine a first event from the plurality of events similar to a computer transaction initiated by a user, and a user interface configured to present the predicted outcome with the likelihood of success for the first event in association with the computer transaction initiated by the user, receive, from the user, an indication to proceed with the computer transaction, and reiterate the predicted outcome with the likelihood of success.

In some examples, the data ranking engine is configured to identify the user profile based on a user manually selecting, via the user interface, the user profile.

An example apparatus to model first computer transaction and analyze second computer transactions comprises one or more processors, and a memory comprising instructions that, when executed by the one or more processors, cause the apparatus to at least, generate a model based on one or more first computer transactions; identify a user profile associated with historically successful computer transactions of the one or more first transactions; collect behavioral data associated with the user profile, wherein the behavioral data comprises a plurality of events corresponding to the successful computer transactions; for each event of the plurality of events determine a predicted outcome with a likelihood of success, compare the predicted outcome with an actual outcome associated with the historically successful computer transactions, and adjust, based on the comparison, the generated model; and determine, based on an output of the generated model, a likelihood of success for one or more second computer transactions initiated by a user.

In some examples, the instructions, when executed, further cause the apparatus to apply the one or more second computer transactions as inputs of the generated model.

In some examples, the instructions, when executed, further cause the apparatus to receive auxiliary data corresponding to each event, and generate the model based on the one or more first computer transactions and the auxiliary data.

In some examples, the one or more second computer transactions initiated by the user correspond to securities trading.

In some examples, the instructions, when executed, further cause the apparatus to present the plurality of events, wherein the presented plurality of events is to be ranked based on the determined predicted outcome for each event.

In some examples, the instructions, when executed, further cause the apparatus to determine a first event from the plurality of events similar to the one or more second computer transactions initiated by the user, and output, from the model, the predicted outcome with the likelihood of success associated with the first event.

In some examples, the instructions, when executed, further cause the apparatus to present the predicted outcome with the likelihood of success for the first event in association with the one or more second computer transactions, accept, from the user, an indication to proceed with the one or more second computer transactions, reiterate the predicted outcome with the likelihood of success, and request confirmation of the one or more second computer transactions.

An example method for determining successfulness of new computer transaction comprises generating, by a computing device, a model based on a plurality of first computer transactions associated with one or more user profiles, determining, by the computing device, a subset of the plurality of first computer transactions associated with the one or more user profiles that correspond to successful computer transactions, refining, by the computing device, the generated model based on the subset, applying the generated model to one or more second computer transactions initiated by a user, and determining, based on an output of the generated model, a likelihood of success for the one or more second computer transactions.

In some examples, the method further comprises determining one or more scores for the plurality of first computer transactions associated with the one or more user profiles.

In some examples, the method further comprises ranking the one or more scores for the plurality of first computer transactions associated with the one or more user profiles.

In some examples, the method further comprises causing output of the determined likelihood of success for the one or more second computer transactions prior to completion of the one or more second computer transactions.

In some examples, the method further comprises receiving an indication that the user intends to proceed with the one or more second computer transactions, and outputting, based on whether the likelihood of success for the one or more second computer transactions satisfies a threshold, an alert or an encouragement.

In some examples, the method further comprises, in response to determining that the likelihood of success for the one or more second computer transactions fails to satisfy the threshold, causing output of alternative computer transactions having a higher likelihood of success.

In examples wherein the threshold is a first threshold, the alert is a first alert, and the encouragement is a first encouragement, the method further comprises, in response to determining that the likelihood of success for the one or more second computer transactions satisfies the first threshold determining whether the likelihood of success for the one or more second computer transactions satisfies a second threshold, and outputting, based on whether the likelihood of success for the one or more second computer transactions satisfies a threshold, a second alert or a second encouragement, wherein the second alert or the second encouragement are associated with a higher scrutiny.

FIG. 1 illustrates an example environment 100 comprising a modeler 102 in communication with a first computing device 104 and/or a second computing device 106 via a network 108. While the example first computing device 104 is illustrated as a desktop computer and the example second computing device 106 is illustrated as a mobile device, the first computing device 104 and/or the second computing device 106 may be any computing device with network capabilities and/or access to computer transaction software or applications.

One or more users may access computer transaction software or applications via the first computing device 104 and/or the second computing device 106 in order to conduct computer transactions. As described herein, aspects of the present disclosure pertain to systems, methods, and apparatus for generating models based on historical data corresponding to computer transactions and users associated with the computer transactions. The example models disclosed herein determine behavior patterns to score computer transactions based on the success of the computer transactions and predict likelihood of success for new transactions input into the models.

The systems, methods, and apparatus may further be utilized to facilitate the initiation of more successful computer transactions for new users that may be unfamiliar with the complexities of the computer transactions. For example, a user may wish to purchase securities but may be unfamiliar with the procedures and whether or not a particular stock, bond, etc. will be successful. The systems, methods, and apparatus may gather historical information associated with previously successful securities transactions and/or previously successful investors and generate scores and rankings to guide a user to make successful securities transactions. The systems, methods, and apparatus may further predict, using the models disclosed herein, the likelihood of success of a securities transaction with which a user wishes to proceed. In examples wherein a user indicates proceeding with a securities transaction with a low score or likelihood of success, the systems, methods, and apparatus may generate an alert reiterating the low score or likelihood of success, the risks involved, a message requesting reaffirmation (e.g., "ARE YOU SURE?"), etc.

It will be apparent to one of ordinary skill in the art that the systems, methods, and apparatus disclosed herein are applicable to many computer transaction systems other than the examples disclosed above.

The example modeler 102 of FIG. 1 may comprise a data ranking engine 110, a model generator 112, a model refiner 114, a data analyzer 116, a user interface 118, and a transaction database 120. The example data ranking engine 110, the example model generator 112, the example model refiner 114, the example data analyzer 116, the example user interface 118, and the example transaction database 120 may be in communication via a communication channel such as, for example, bus 122.

The example transaction database 120 may comprise a plurality of user profiles associated with a plurality of computer transactions from one or more computer transaction systems. For example, users of computer transaction systems may create profiles, accounts, or other system identities in order to utilize the computer transaction systems. As users utilize the computer transaction systems, events in which the user is associated with (e.g., computer transactions) may be recorded, analyzed, or otherwise stored for the benefit of the user and the systems. The example transaction database 120 may consolidate one or more databases associated with the one or more computer transaction systems and the corresponding plurality of user profiles associated with computer transactions. In some examples, the identity of the user associated with a user profile is hashed or otherwise obfuscated. As disclosed herein, the transaction database 120 may be sorted or ranked according to user profile or transaction scores determined by the data analyzer 116. The example transaction database 120 may be searchable by user profile; by computer transaction type, date, amount, etc.; and, as further described herein, by score.

The example data ranking engine 110 analyzes the contents of the transaction database 120 for previously successful computer transactions and the user profiles associated therewith. As disclosed herein, the example data analyzer 116 may identify what makes a computer transaction and/or a user profile successful, and the data ranking engine 110 may identify patterns or trends across multiple user profiles and/or computer transactions. For example, the data ranking engine 110 may determine that a particular computer transaction type (e.g., a long term transaction, a short term transaction, a transaction with a particular subject matter, a transaction associated with a particular entity, etc.) is successful for numerous user profiles. Similarly, the data ranking engine 110 may determine a particular user profile has a history of numerous successful computer transactions of many types. The example data ranking engine 110 may analyze the successfulness of user profiles and computer transactions in connection with one or more models generated by the model generator 112 to determine behavior patterns of users and generate scores for the user profiles and/or the corresponding computer transactions. The data ranking engine 110 may further rank the user profiles and/or the corresponding computer transactions according to the generated scores. Additionally, the data ranking engine 110 may prepare a particular user profile and/or computer transaction for analysis using the one or more models disclosed herein The example model generator 112 builds one or more models based on the contents of the transaction database 120. In some examples, the model is built using machine-learning algorithms using the contents of the transaction database 120 to build the model. In some examples, the model may be manually limited to particular user profiles and/or computer transactions based on user input through the user interface 118. For example, a user may only be interested in long term computer transactions (e.g., long term investments) or may be interested in computer transactions similar to those of a particular user profile (e.g., Warren Buffet's investment portfolio), and thus may decide that only profiles and/or transactions similar to the interest of the user should be used in generating the model.

The example model refiner 114 may refine and/or train the generated model using a subset of the contents of the transaction database 120, such as, for example, successful user profiles and/or successful computer transactions determined by the data analyzer 116. Additionally, new data from new user profiles and/or new computer transactions can be used to update the model in real-time. Furthermore, predictive data for computer transactions may be applied to update the model. The example model refiner 114 may further test the accuracy of iterations of the model using parameters of a computer transaction and comparing the output of the model to the historical result of the computer transaction. The example model refiner 114 may continue to update the model with new data until the model is considered to have an optimal accuracy. An optimal accuracy may be determined by recording accuracy tests over time, determining that the accuracy decreases a first threshold number of times after the accuracy has increased a second threshold amount of times (i.e., to distinguish a maximum from a local maxima), and determining the model iteration associated with the last increase is the optimal model with an optimal accuracy.

The example data analyzer 116 may analyze the user profiles and/or computer transactions to identify successful users and/or transactions. The example data analyzer breaks down computer transactions into objective elements such as the subject matter (i.e., the "what"), the parties involved (i.e., the "who"), the amount at stake (i.e., the "how much"), the date and/or time (i.e., the "when"), and the corresponding outcome. In some examples, the example data analyzer 116 determines that a user profile that comprises a plurality of successful computer transactions is a successful user profile. Furthermore, the example data analyzer 116 analyzes auxiliary data corresponding with successful transactions to determine correlations or patterns between the auxiliary data and the decision to make the ultimately successful transaction to determine subjective elements (i.e., a "why"). Examples of auxiliary data include, without limitation, current events, economic conditions, market conditions, environmental conditions, fiscal disclosures of one or more companies involved with the event, investment portfolio distribution associated with the user profile, associated accidents, contractual obligations, etc. From the data, the example data analyzer 116 may generate a score for computer transactions and/or user profiles representative of a likelihood of success. The example score may range between 0 and 10, 0 and 100, or another range. For example, a user profile may have a score of 90 when, on average, the computer transactions associated with the user profile have a high likelihood of success. Similarly, a computer transaction may have a score of 25 when an average of similar computer transactions indicates a low likelihood of success.

In some examples, the data analyzer 116 compares user profile and/or computer transaction scores to one or more threshold values (e.g., 25, 50, 75, etc.) to determine whether the user profile and/or computer transaction has a low likelihood of success, an average likelihood of success, an above-average likelihood of success, a high likelihood of success, etc. The example data analyzer 116 outputs any and/or all data to the model generator 112 and/or the model refiner 114 for building and/or refining the one or more models, as disclosed herein.

In some examples, a user of a computer transaction system will initiate a new computer transaction. The example data analyzer 116 may similarly determine a score for the new computer transaction as described above. For example, the data analyzer 116 may identify prior computer transactions similar to the new computer transaction and utilize the prior score as the new score. Alternatively, the parameters of the new computer transaction may be input into the model and the data analyzer 116 may generate a score based on the parameters and the output of the model. In examples wherein the determined score indicates a low likelihood of success, the data analyzer 116 determines alternate computer transactions that have higher scores that the new computer transaction to present to the user. Accordingly, the data analyzer 116 may also output data to the user interface 118 for presentation to users.

The example user interface 118 may interact with users of the example systems and apparatus disclosed herein. In some examples, the user interface 118 is a web portal used in connection with and/or overlaid on a computer transaction system. The user interface 118 may cause the output of one or more scores generated by the data analyzer 116. In some examples, the one or more scores may be ranked from highest score to lowest score and may be presented to a user. In some examples, the one or more scores may be used to deter a user from or persuade a user towards a computer transaction. Additionally, the user interface 118 may output alerts (e.g., "ARE YOU SURE?") when a user indicates proceeding with a computer transaction having a low likelihood of success and/or output other encouragements (e.g., "GREAT DECISION") when a user indicates proceeding with a computer transaction having a high likelihood of success. In some examples, the user interface 118 may cause output of potential losses should the user continue a computer transaction having a low likelihood of success. In some examples, the user interface 118 may present alternative computer transactions determined by the data analyzer 116.

Figure 2:
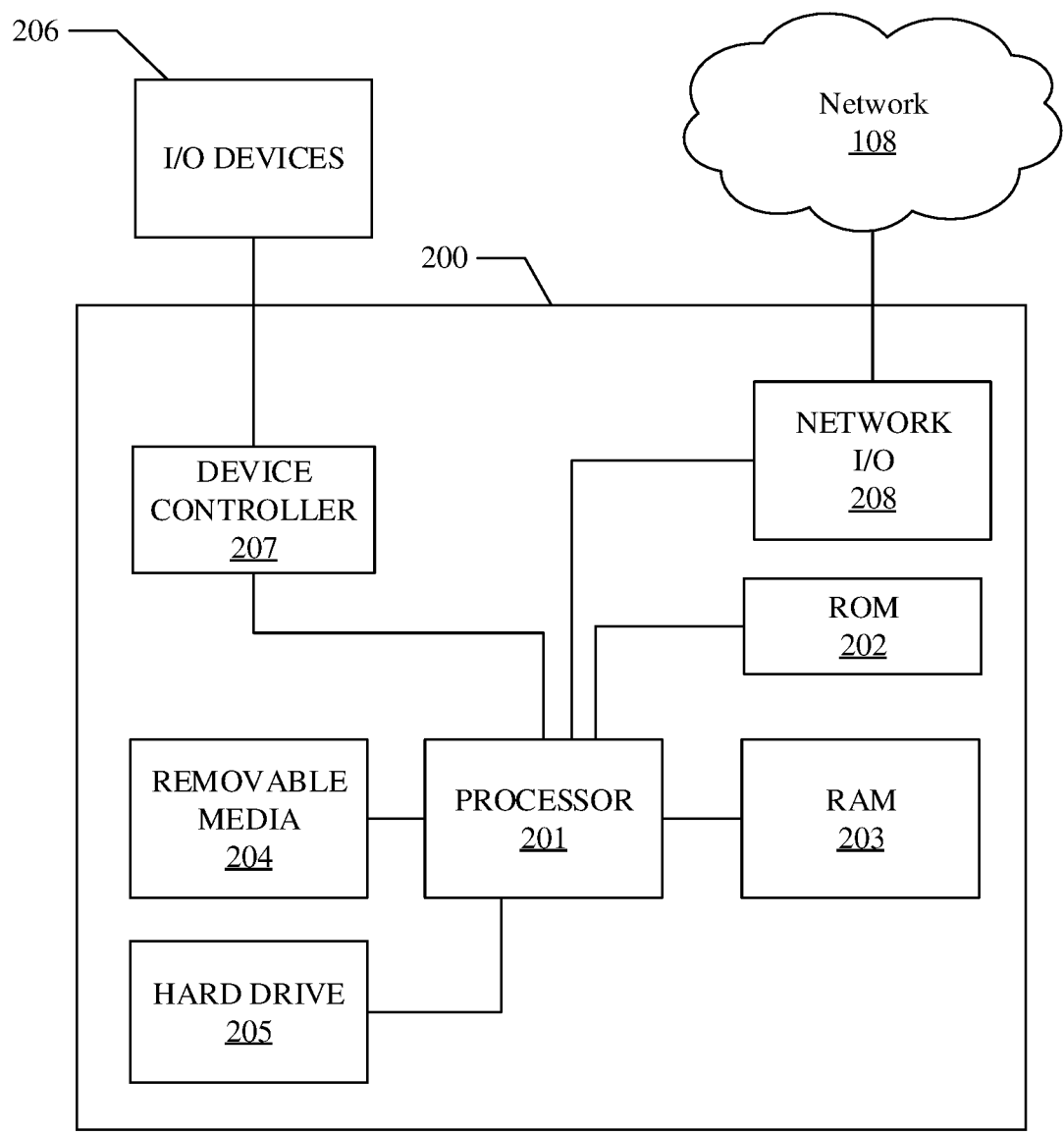
FIG. 2 illustrates an example computing device specifically configured to at least perform the methods of FIGS. 3-4.

The example modeler 102, the example first computing device 104, the example second computing device 106, and/or other computing devices described herein may be implemented via a hardware platform such as, for example, the computing device 200 illustrated in FIG. 2. Some elements described with reference to the computing device 200 may be alternately implemented in software. The computing device 200 may include one or more processors 201, which may execute instructions of a computer program to perform any of the features described herein. For example, the example data ranking engine 110, the example model generator 112, the example model refiner 114, the example data analyzer 116, and the example user interface 118 may be implemented by the one of more processors 201 executing instructions stored in memory. The instructions may be stored in any type of tangible computer-readable medium or memory, to configure the operation of the processor 201. As used herein, the term tangible computer-readable storage medium is expressly defined to include storage devices or storage discs and to exclude transmission media and propagating signals. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more input/output devices 206, such as a display, touch screen, keyboard, mouse, microphone, software user interface, etc. The computing device 200 may include one or more device controllers 207 such as a video processor, keyboard controller, etc. The computing device 200 may also include one or more network interfaces 208, such as input/output circuits (such as a network card) to communicate with a network such as the example network 108. The network interface 208 may be a wired interface, wireless interface, or a combination thereof. One or more of the elements described above may be removed, rearranged, or supplemented without departing from the scope of the present disclosure.

Figure 3:
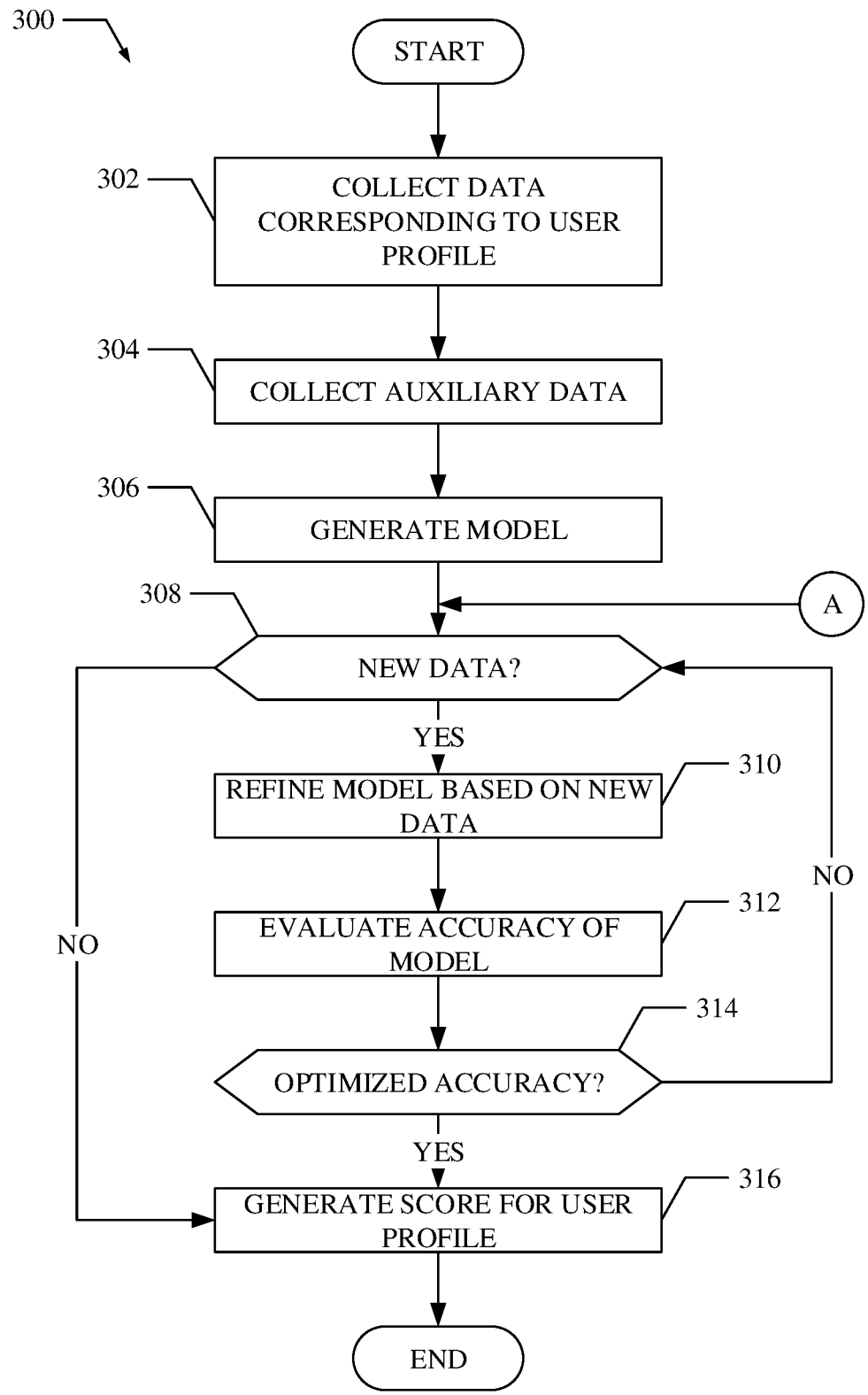
FIGS. 3-4 illustrate flowcharts representative of processes that may be implemented as computer readable instructions executable by the example computing device of FIG. 2.

FIG. 3 illustrates a flow chart representative of machine readable instructions that, when executed, may cause a computing device to implement a process 300 to generate, train, and evaluate a mathematical model. The example process 300 begins at block 302. At block 302, the example data ranking engine 110 identifies a user profile associated with a history of successful computer transactions. In some examples, the data ranking engine is configured to identify the successful user profile based on a user manually selecting, via the user interface 118, the user profile. Additionally, at block 302 the example model generator 112 begins collecting data associated with the identified user profile and a history of computer transactions (e.g., both successful and unsuccessful computer transactions) associated with the user profile. At block 304, the example model generator 112 collects auxiliary data corresponding to the behavior of users, detailed at least by the user's history of computing transactions. For example, wherein the computer transactions corresponding to securities trading, the auxiliary data may include economy/market conditions, environment/climate conditions (e.g., climate effects, crop yield, etc.), company financial disclosures, etc. In such an example, the disclosed systems, apparatus, and methods determine the effect, if any, that economy/market conditions, environment/climate conditions (e.g., climate effects, crop yield, etc.), company financial disclosures, etc. has on a decision to make a particular securities transaction and/or the success thereof. The example data analyzer 116 may determine behavior patterns of users based on the history of computing transactions The collected data may further include real-time data and/or predictions. Based on the data collected at blocks 302 and 304, the example model generator 112 may generate a data model (block 306).

At block 308, the example model refiner 114 determine whether any new data (corresponding to the collected data) is available. For example, real-time data changes in as time progresses. Thus, the model refiner 114 monitors for real-time changes, updated predictions, etc. If the example model refiner 114 determines that new data is available (block 308: YES), control proceeds to block 310. At block 310, the example model refiner 114 adjusts the model generated at block 306 with the new data. At block 312, the example model refiner 114 evaluates the accuracy of the model based on a subset of the data collected in blocks 302 and 304 (e.g., successful computer transactions).

At block 314, the example model refiner 114 determines whether the accuracy of the model is optimal. For example, after each adjustment of the model, the accuracy may be evaluated and stored. In some examples, when the accuracy iteratively increases and then subsequently begins to decrease, the example model refiner 114 may determine the accuracy to be optimized at the last increase. In some examples, the example model refiner 114 determines the accuracy to be optimized if numerous decreases occur after numerous increases (i.e., to distinguish a maximum from a local maxima). If the example model refiner 114 determines that the accuracy of the model is not optimal (block 314: NO), control returns to block 308.

If the example model refiner 114 determines that no new data is available (block 308: NO) or if the example model refiner 114 determines that the accuracy of the model is optimal (block 314: YES), control proceeds to block 316. At block 316, the example model data analyzer 116 generates a score for the user profile based on the generated model. Thereafter, the example process 300 ceases operation.

Figure 4:
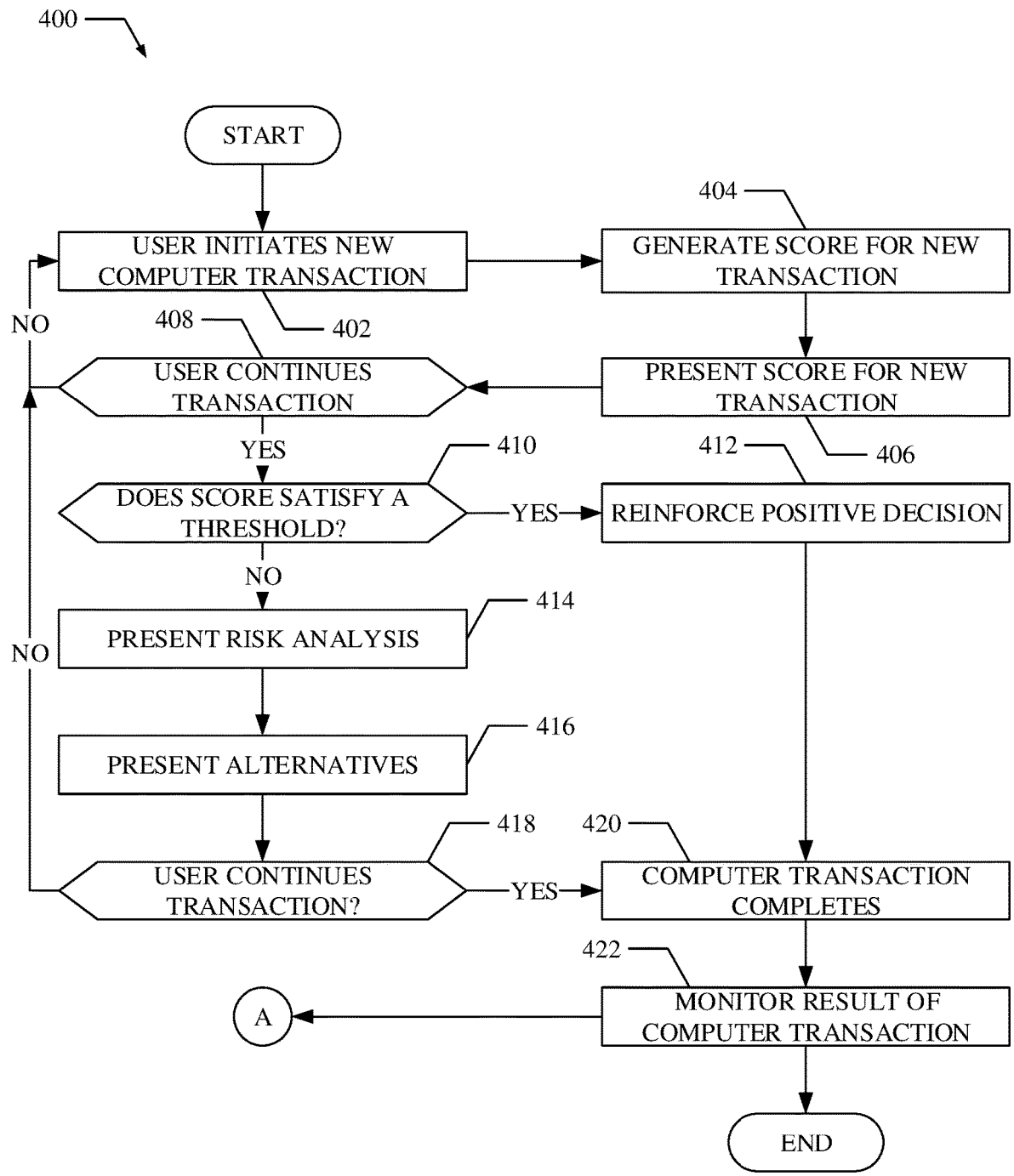

FIG. 4 illustrates a flow chart representative of machine readable instructions that, when executed, may cause a computing device to implement a process 400. The example process 400 begins at block 402. At block 402, a user initiates a new computer transaction via a computing device (e.g., the first computing device 104, the second computing device 106, etc.). The example under interface 118 may receive a command corresponding to the user requesting the new computer transaction. At block 404 the example data analyzer 116 generates a score for the new computer transaction. In some examples, the data analyzer 116 determines a computer transaction from a user profile that is similar to the new computer transaction and uses the score associated with the computer transaction from the user profile for the score of the new computer transaction. In some examples, parameters of the new computer transaction are applied to the model generated by the model generator 112 (e.g., according to FIG. 3) to output the score for the new computer transaction.

At block 406, the example user interface 118 causes output of the generated score for the new computer transaction for presentation to the user. As disclosed herein, the score may correspond to a probability of success for the new computer transaction. At block 408, the example user interface 118 determines whether the user continues with or cancels the new transaction. For example, a user may be presented the score for the transaction and may indicate his or her intent to continue by selecting an advancing option (e.g., clicking a "next" button, loading a related webpage, etc.). Similarly, a user may indicate his or her intent to discontinue by selecting a canceling option, terminating a user session (e.g., loading an unrelated webpage, closing an app or webpage, etc.), etc. If the example user interface 118 receives an indication that the new transaction is to be cancelled (block 408: NO), control returns to block 402. If the example user interface 118 receives an indication that the new transaction is to continue (block 408: YES), control proceeds to block 410.

At block 410, the example data analyzer 116 may determine whether the score generated at block 404 satisfies a first threshold. The first threshold may be a number differentiating a positive likelihood of success from an average likelihood of success. For example, the first threshold may be set to 85 out of 100 such that a score greater than or equal to 85 signifies a positive likelihood of success and a score less than 85 signifies a negative likelihood of success. Of course, the first threshold may be any number and the present disclosure should not be limited by way of the previous examples. In some examples, the data analyzer 116 determines whether the score generated at block 404 satisfies a second threshold, wherein the second threshold is associated with a higher scrutiny or severity level. For example, the second threshold may be set to 95 such that only a score greater than or equal to 95 signifies a positive likelihood of success and all other scores signify a negative likelihood of success.

Similarly, the first and second thresholds may be likelihoods of failure. For example, the first threshold may be set to 50 out of 100 such that a score less than or equal to 50 signifies an unlikelihood of success. In such examples, the user interface 118 may present a message such as "ARE YOU SURE?" In some examples, the second threshold is associated with a higher scrutiny or severity level. For example, the second threshold may be set to 25 out of 100 such that a score less than or equal to 25 signifies a very high risk computer transaction. In some such examples, the user interface 118 may present a message such as "ARE YOU REALLY SURE?"

If the example data analyzer 116 determines that the score generated at block 404 satisfies the threshold (block 410: YES), control proceeds to block 412. At block 412, the example user interface 118 may cause output of an encouragement such as, for example, reinforcement of a positive decision. In such an example, the user interface 118 emphasizes that the new computer transaction the user initiated has a high likelihood of success. However, if the example data analyzer 116 determines that the score generated at block 404 fails to satisfies the threshold (block 410: NO), control proceeds to block 414. At block 414, the example user interface 118 may cause output of a risk analysis. For example, the example user interface 118 may reiterate the score generated at block 404, which may correspond to a low likelihood of success. Additionally, the user interface 118 may cause output of potential losses should the new computer transaction continue. In some examples, the user interface 118 may present alternative computer transactions determined by the data analyzer 116 (block 416). For example, the data analyzer 116 may identify similar computer transactions with higher scores for the user interface 118 to present to the user.

At block 418, the example user interface 118 determines whether the user continues with or cancels the new transaction. If the example user interface 118 receives an indication that the new transaction is to be cancelled (block 418: NO), control returns to block 402. If the example user interface 118 receives an indication that the new transaction is to continue (block 418: YES), or after block 412, control proceeds to block 420.

At block 420, the new computer transaction completes. At block 420, the data analyzer 116 monitors the parameters of the new computer transaction, auxiliary data corresponding to the date and/or time at which the new computer transaction was completed, and whether or not the computer transaction is successful. Such data may be sent to the model refiner 114 (e.g., control proceeds to block 308 of FIG. 3) and used to refine the model generated as disclosed with reference to FIG. 3. Thereafter, the example process 400 ceases operation.

The above discussed embodiments are simply examples, and modifications may be made as desired for different implementations. For example, steps and/or components may be subdivided, combined, rearranged, removed, and/or augmented; performed on a single device or a plurality of devices; performed in parallel, in series; or any combination thereof. Additional features may be added.

The invention claimed is:

1. One or more non-transitory computer-readable media storing computer-executable instructions that, when executed by a computing device, cause the computing device to:
   identify a user profile associated with historical computer financial security trade transactions of a first category;
   collect behavioral data associated with the user profile, wherein the behavioral data comprises a plurality of events corresponding to the computer financial security trade transactions of the first category;
   receive, over a network, auxiliary data corresponding to each event;
   receive, from a user via a first user interface, a first new computer financial security trade transaction for evaluation;
   execute a financial security trade model to determine a first predicted outcome associated the first new computer financial security trade transaction based on similarities between the first new computer financial security trade transaction and the computer financial security trade transactions of the first category and the auxiliary data;
   compare the first predicted outcome with an actual outcome associated with the computer financial security trade transactions of the first category;
   refine the financial security trade model based on the comparing;
   determine an accuracy of the refined financial security trade model is optimized by determining that the accuracy has decreased after previous increases;
   receive, from the user and via the first user interface, a second new computer financial security trade transaction;
   execute the refined, optimized financial security trade model to determine a second predicted outcome associated with the second new computer financial security trade transaction based on similarities between the second new computer financial security trade transaction and the computer financial security trade transactions of the first category;
   identify a score indicating a likelihood of success associated with the second new computer financial security trade transaction;
   display a second user interface, the second user interface including the score associated with the second new computer financial security trade transaction and the second predicted outcome, the second user interface further including a request for user input associated with whether to proceed with the second new computer financial security trade transaction;
   responsive to receiving user input to not proceed with the second new computer financial security trade transaction, cancel the second new computer financial security trade transaction; and
   responsive to receiving user input to proceed with the second new computer financial security trade transaction, execute, via a trading system, the second new computer financial security trade transaction.

2. The one or more non-transitory computer-readable media of claim 1, further comprising instructions that, when executed, cause the computing device to identify a profile score for the user profile.

3. The one or more non-transitory computer-readable media of claim 2, further including instructions that, when executed, cause the computing device to rank, based on the profile score, the user profile among a plurality of user profiles.

4. The one or more non-transitory computer-readable media of claim 1, wherein the auxiliary data comprises at least one of current events, economic conditions, market conditions, environmental conditions, fiscal disclosures of one or more companies involved with each event, investment portfolio distribution associated with the user profile, associated accidents, contractual obligations, or any combination thereof.

5. The one or more non-transitory computer-readable media of claim 1, wherein the user profile is identified based on a user manually selecting, via the first user interface, the user profile.

6. A method, comprising:
   at a computing device having at least one processor, a communication interface, and a memory:
   identifying, by the at least one processor, a user profile associated with historical computer financial security trade transactions of a first category;
   collecting, by the at least one processor, behavioral data associated with the user profile, wherein the behavioral data comprises a plurality of events corresponding to the computer financial security trade transactions of the first category;
   receive, by the at least one processor and over a network, auxiliary data corresponding to each event;
   receive, by the at least one processor and from a user via a first user interface, a first new computer financial security trade transaction for evaluation;
   executing, by the at least one processor, a financial security trade model to determine a first predicted outcome associated the first new computer financial security trade transaction based on similarities between the first new computer financial security trade transaction and the computer financial security trade transactions of the first category and the auxiliary data;
   comparing, by the at least one processor, the first predicted outcome with an actual outcome associated with the computer financial security trade transactions of the first category;
   refining, by the at least one processor, the financial security trade model based on the comparing;

determining, by the at least one processor, an accuracy of the refined financial security trade model is optimized by determining that the accuracy has decreased after previous increases;

receive, by the at least one processor and from the user and via the first user interface, a second new computer financial security trade transaction;

executing, by the at least one processor, the refined, optimized financial security trade model to determine a second predicted outcome associated with the second new computer financial security trade transaction based on similarities between the second new computer financial security trade transaction and the computer financial security trade transactions of the first category;

identifying, by the at least one processor, a score indicating a likelihood of success associated with the second new computer financial security trade transaction;

displaying, by the at least one processor, a second user interface, the second user interface including the score associated with the second new computer financial security trade transaction and the second predicted outcome, the second user interface further including a request for user input associated with whether to proceed with the second new computer financial security trade transaction;

responsive to receiving user input to not proceed with the second new computer financial security trade transaction, cancelling, by the at least one processor, the second new computer financial security trade transaction; and responsive to receiving user input to proceed with the second new computer financial security trade transaction, executing, by the at least one processor and via a trading system, the second new computer financial security trade transaction.

7. The method of claim 6, further comprising causing, by the at least one processor, the computing device to identify a profile score for the user profile.

8. The method of claim 7, further including causing, by the at least one processor, the computing device to rank, based on the profile score, the user profile among a plurality of user profiles.

9. The method of claim 6, wherein the auxiliary data comprises at least one of current events, economic conditions, market conditions, environmental conditions, fiscal disclosures of one or more companies involved with each event, investment portfolio distribution associated with the user profile, associated accidents, contractual obligations, or any combination thereof.

10. The method of claim 6, wherein the user profile is identified based on a user manually selecting, via the first user interface, the user profile.

11. A computing device, comprising:
at least one processor;
a communication interface; and
a memory storing computer-executable instructions that, when executed by the at least one processor, cause the computing device to:
identify a user profile associated with historical computer financial security trade transactions of a first category;
collect behavioral data associated with the user profile, wherein the behavioral data comprises a plurality of events corresponding to the computer financial security trade transactions of the first category;

receive, over a network, auxiliary data corresponding to each event;

receive, from a user via a first user interface, a first new computer financial security trade transaction for evaluation;

execute a financial security trade model to determine a first predicted outcome associated the first new computer financial security trade transaction based on similarities between the first new computer financial security trade transaction and the computer financial security trade transactions of the first category and the auxiliary data;

compare the first predicted outcome with an actual outcome associated with the computer financial security trade transactions of the first category;

refine the financial security trade model based on the comparing;

determine an accuracy of the refined financial security trade model is optimized by determining that the accuracy has decreased after previous increases;

receive, from the user and via the first user interface, a second new computer financial security trade transaction;

execute the refined, optimized financial security trade model to determine a second predicted outcome associated with the second new computer financial security trade transaction based on similarities between the second new computer financial security trade transaction and the computer financial security trade transactions of the first category;

identify a score indicating a likelihood of success associated with the second new computer financial security trade transaction;

display a second user interface, the second user interface including the score associated with the second new computer financial security trade transaction and the second predicted outcome, the second user interface further including a request for user input associated with whether to proceed with the second new computer financial security trade transaction;

responsive to receiving user input to not proceed with the second new computer financial security trade transaction, cancel the second new computer financial security trade transaction; and responsive to receiving user input to proceed with the second new computer financial security trade transaction, execute, via a trading system, the second new computer financial security trade transaction.

12. The computing device of claim 11, further comprising instructions that, when executed, cause the computing device to identify a profile score for the user profile.

13. The computing device of claim 12, further including instructions that, when executed, cause the computing device to rank, based on the profile score, the user profile among a plurality of user profiles.

14. The computing device of claim 11, wherein the auxiliary data comprises at least one of current events, economic conditions, market conditions, environmental conditions, fiscal disclosures of one or more companies involved with each event, investment portfolio distribution associated with the user profile, associated accidents, contractual obligations, or any combination thereof.

15. The computing device of claim 11, wherein the user profile is identified based on a user manually selecting, via the first user interface, the user profile.

* * * * *